United States Patent
Hansen et al.

[15] 3,706,903
[45] Dec. 19, 1972

[54] SEC CAMERA TUBE AND IMAGE INTENSIFIER PROTECTION AGAINST EXCESSIVE LIGHT DAMAGE

[72] Inventors: Jay M. Hansen, Santa Monica; Donald J. Holscher, Playa Del Rey; Paul R. Prince, Manhattan Beach, all of Calif.

[73] Assignee: Hughes Aircraft Company, Culver City, Calif.

[22] Filed: Nov. 3, 1969

[21] Appl. No.: 870,544

[52] U.S. Cl....................................................315/10
[51] Int. Cl..............................................H01j 31/48
[58] Field of Search..315/10, 11, 12; 178/7.92, 7.2 E

[56] References Cited

UNITED STATES PATENTS

| | | | |
|---|---|---|---|
| 3,198,883 | 8/1965 | Borberg et al. | 178/7.2 E |
| 3,377,427 | 4/1968 | Fischer | 178/7.2 E |
| 2,978,537 | 4/1961 | Kruse, Jr. et al. | 178/7.2 E |
| 3,419,745 | 12/1968 | Wenzel | 178/7.2 E |

FOREIGN PATENTS OR APPLICATIONS 232,311  5/1969  U.S.S.R...............................178/7.2 E

*Primary Examiner*—Rodney D. Bennet, Jr.
*Assistant Examiner*—N. Moskowitz
*Attorney*—James K. Haskell and Walter J. Adam

[57] ABSTRACT

Protection of a low level television camera tube used with an image intensifier tube is provided by a shutter and a current limiting element in series with the photocathode of the image intensifier tube to cause the electron image in the intensifier to defocus, thereby providing protection for the camera tube while the shutter is being closed. A current limiting element in series with the photocathode of the camera tube further aids in protecting the target of the camera tube by reducing the kinetic energy of photoelectrons produced in response to a light image from the intensifier. A photodetector responds to excessive illumination to cause a control circuit to close the shutter.

13 Claims, 3 Drawing Figures

INVENTORS.
JAY M. HANSEN,
DONALD J. HOLSCHER,
PAUL R. PRINCE
BY J. K. Haskell
ATTORNEY.

SEC CAMERA TUBE AND IMAGE INTENSIFIER PROTECTION AGAINST EXCESSIVE LIGHT DAMAGE

BACKGROUND OF THE INVENTION

This invention relates to protection of a low-light-level television camera tube from an excessive level of illumination, and more particularly, to protection of such a camera tube used with an image intensifier tube.

There is often a need for a television system capable of operating in almost total darkness, such as for televising newsworthy events, or for covert security or military surveillance, without any illumination except that provided by the stars. Such a system may be provided with a low-light-level camera tube and an image intensifier, but the system is then so sensitive to light that damage may occur from high light density, particularly to the target of the camera tube.

A particularly useful low-light-level camera tube is a secondary electron conduction (SEC) camera tube. It consists of an electrostatically focused diode image section having a semitransparent photocathode on a plano-concave surface inside the face thereof. The photocathode emits photoelectrons from illuminated areas in direct proportion to the amount of radiation received. A target is disposed to receive photoelectrons through an electrostatic lens formed by an electrostatic field between the photocathode and an annular anode. The photocathode is connected to a power supply voltage of typically $-7.5$ kV while the anode and target are connected to voltages of typically 0 and $+20$ volts, respectively. The large voltage difference accelerates the photoelectrons towards the target where they dissipate most of their kinetic energy by generating secondary electrons, thereby creating a positive charge pattern which corresponds to the optical image focused on the photocathode, but reduced in size by the electrostatic lens. The charge pattern is then read out by a magnetically focused and deflected low velocity electron beam which scans the target and returns its surface to its original potential of $+20$ volts. The current which flows through the target as a result of electrons deposited on the charged areas then constitutes the desired video signal output.

The target of a low-light-level camera tube, such as an SEC camera tube, may be damaged by an excessive amount of photoelectron energy resulting from unduly high light level. With a limited amount of stored energy in the photocathode, the level of light which will produce damage is a function of not only the photocathode voltage and the exposure time, but also the area of the photocathode being illuminated. The relationship between illumination and level exposure time has been found to be a straight line on a logarithmic graph with a slope of approximately 1 from typically $10^5$ foot-candles for $10^{-5}$ minutes to $10^{-2}$ foot-candles for 100 minutes with a photocathode potential of about $-7.5$ kV. An increase or decrease of the photocathode potential merely displaces the straight line on the graph downwardly or upwardly. Thus, for a given photocathode potential, the straight line graph indicates that relatively high levels of illumination will not cause damage over short periods of time.

Damage to the target is believed to be due to total exposure. The target is actually a very thin membrane which, when penetrated by photoelectrons, will tend to change the physical structure. Integration for short times is physically reasonable if the effect on the tube is on the basis of heating; then the heat will begin to be conducted away from the penetrated area for longer exposure times. Therefore heating cannot be the sole reason for damage over a long exposure time.

The photocathode has a finite stray capacitance typically in the order of 10 picofarads. Therefore, with a photocathode potential of $-7.5$ kV, the total energy stored is typically about $2.8\times10^{-4}$ joules. If a given SEC camera tube takes 56 foot-candles-seconds to damage the target at $-7.5$ kV photocathode potential with total illumination, a ratio of damaging energy to area can be determined from the total area of the target. That is typically 0.063 joules per square centimeter. From that the approximate smallest image area that will not damage the target may be computed by dividing the total energy stored by the ratio found. That area is typically $4.5\times10^{-3}$ centimeters square, which corresponds to an image diameter of 0.7 millimeters, and corresponds to various angular diameters of the illumination source, depending upon the intensifier magnification. Larger images would have an energy density below the damage threshold of 0.063 joules per square centimeter if the energy is limited to that stored by the stray capacitance.

An image intensifier is a tetrode having a photocathode at one end and an anode at the other end in an arrangement similar to the image section of the SEC camera tube, but with a concave phosphor in place of the SEC target. A first focusing electrode is connected to a source of constant potential to focus emitted photoelectrons onto the phosphor, and a second focusing electrode is sometimes connected to a source of variable potential to vary the magnification in a manner analogous to varying the focus of a zoom lens. As the photoelectrons strike the phosphor, kinetic energy is transformed into radiant energy which is coupled to the photocathode of the SEC camera tube by fiber optics. The output image of the intensifier is reduced and inverted at the face of the SEC tube. The latter will again invert the image and will further reduce it on the face of its target.

The phosphor of an image intensifier is subject to being damaged by an excessively high energy density, but when used with an SEC camera tube for low light level applications, the critical energy density threshold of the SEC target will likely be exceeded before the phosphor of the image intensifier is damaged. Therefore, the phosphor must be protected from high energy density primarily to protect the SEC target. But even when an image intensifier is used without an SEC camera tube, as when used with a conventional vidicon tube where the optical output of the image intensifier is coupled directly onto the target having a photoconductive layer to store a charge pattern, it may still be desirable to protect the phosphor of the image intensifier from excessively high energy densities.

The photocathode of an image intensifier of an SEC camera tube is also subject to being damaged by excessive illumination, but the level of radiant energy that could cause damage in a given period of time is usually greater than the transformed kinetic energy that could damage the phosphor of the image intensifier, and certainly greater than the transformed kinetic energy that would damage the SEC target. Accordingly, while it is desirable to consider protecting the photocathode from excessive light levels, such as with an automatic shutter, it is imperative that the SEC target be protected from excessive energy densities while the excessive light condition is being detected and a shutter is being closed, particularly since it requires a relatively long period (typically 100 milliseconds) to close the shutter, and the maximum safe illumination level for that period of time is only about $10^{-3}$ foot-candles (whereas the maximum safe illumination for periods less than $10^{-5}$ minutes is $10^5$ foot-candles). For example, if a nuclear burst were focused directly upon the SEC target of a camera tube, damage could occur within $10^{-8}$ seconds. With the use of an image intensifier with light gain of 100 to 1,000, damage could occur within $10^{-10}$ to $10^{-11}$ seconds.

In the past it has been suggested that the target of an image orthicon be protected against permanent damage from excessive illumination as might be expected at newsworthy events where photoflash lamps are being fired. The technique that has been recommended consists of placing a resistor in series with the photocathode of the image orthicon. Such a resistor does not interfere with normal operation, but presumably does protect the target, apparently by limiting photoelectron current, and thereby limiting the power available to damage the target. However, the target is a sheet of very thin metal oxide (typically magnesium oxide) which emits secondary electrons when struck by photoelectrons. The secondary electrons are captured by a screen in front of the target, thus creating a charge on the impinged surface of the target. Because the target has high surface resistance as compared to the resistance through the metal oxide to the other side, a corresponding charge pattern is developed on the other side. Accordingly, the target is believed to be heated by only that energy of the bombarding electrons not transferred to the secondary electrons which are absorbed by the target screen. Therefore, most of the photoelectrone energy is absorbed by the target screen which is made of a metal capable of withstanding high energy densities.

In an SEC camera tube, the target consists of a supporting metal membrane (typically a film of aluminum about 500 A. thick with a layer of $AL_2O_3$ of about the same thickness in front) and a highly porous layer of salt, such as potassium chloride, in back. The photoelectrons striking the membrane in front penetrate the metal and dissipate most of their energy in the porous layer beyond by generating secondary electrons which migrate toward the metal, thereby creating a positive charge in the porous layer. Since most of the kinetic energy of the photoelectrons is absorbed by the target, the problem of target damage as a result of excessively high energy densities is more critical in SEC camera tubes than in an image orthicon, particularly when used with image intensifiers. It would not be apparent that a current limiting resistor in series with the photocathode of an SEC camera tube would be sufficient to provide short term protection for the target, particularly when an image intensifier is being used, for even if the resistor were effective to limit the energy available to damage the target for a given area of photocathode illumination, there is still a critical size of image below which the energy density is sufficient to cause permanent damage. As noted hereinbefore, the critical size has been found to be about 0.7 millimeters for stray photocathode capacitance in an SEC camera tube of about 10 picofarads.

SUMMARY OF THE INVENTION

In accordance with the present invention photodetecting means is provided to produce a signal proportional to the intensity of illumination from a scene being viewed by a low-light-level camera tube with an image intensifier tube. A general threshold detecting means responds to that signal when it exceeds a predetermined threshold to close a shutter that is disposed in front of the image intensifier tube in a position to block light transmitted to the optics from the scene. A second threshold detecting means responds to that signal, or to the video signal, to close the shutter when the illumination received is from a damaging flash, such as a nuclear burst. A timing means is actuated in the event of such a flash to hold the shutter closed for a predetermined period sufficient for a second flash of light to be detected, if the first was from a nuclear burst, or if the initial flash is sustained at a level sufficiently high to cause the threshold level of the general threshold detecting means to be exceeded. To protect the camera tube and image intensifier for the short period required to close the shutter, and for short periods at all other times, whether or not a shutter is provided, current limiting devices are connected in series with the photocathode of the camera tube and the image intensifier, thereby defocusing the image intensifier within a critical time during which the target of the camera tube cannot be damaged by an image of any size or brilliance, and decreasing the kinetic energy of photoelectrons in the camera tube for an image of such size or brilliance as might thereafter cause damage.

DESCRIPTION OF THE PREFERRED EMBODIMENT

Figure 1:
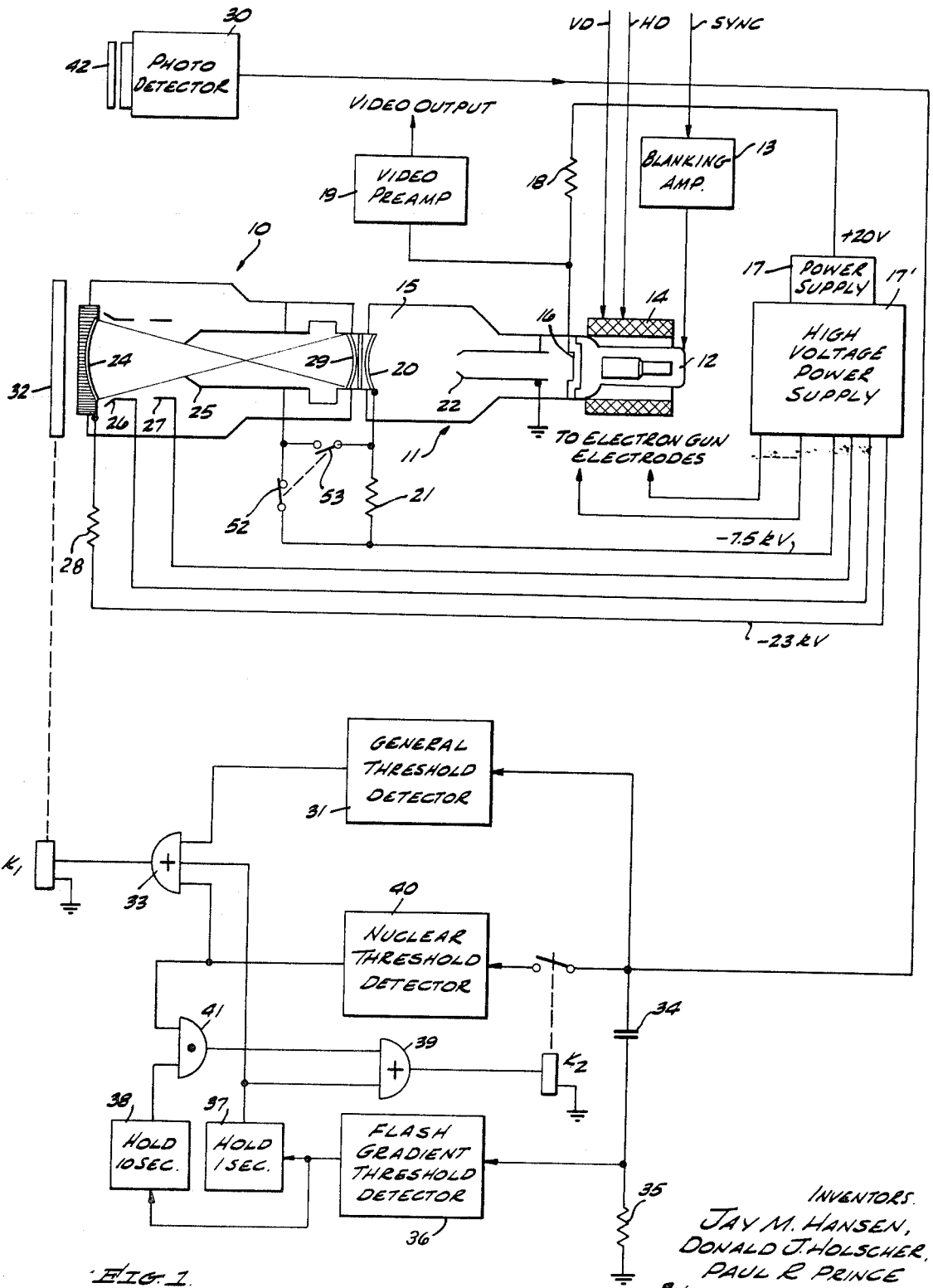
FIG. 1 illustrates schematically a preferred embodiment of the present invention.

Referring to FIG. 1 of the drawings, an image intensifier 10 and SEC camera tube 11 are schematically illustrated. The latter includes an electron gun section 12 which receives synchronizing (SYNC) signals through a blanking amplifier 13. Alignment and deflection of the electron beam in the gun section 12 is accomplished by transverse magnetic fields produced by external coils 14 which receive horizontal and vertical deflection control signals (VD and HD) from control apparatus (not shown).

The interface between an image section 15 and the electron gun section 12 is a target 16 which is connected to a target voltage power supply 17 of typically +20 volts through a load resistor 18. When an image transformed into a charge pattern on the target 16 is read out by the scanning beam in the electron gun section 12, the target 16 is returned to the gun cathode potential, thereby causing a current flow through the load resistor 18 which is proportional to the amplitude of the charge pattern. The voltage across the load resistor 18 then constitutes the video signal which is transmitted through a video preamplifier 19 as the video output.

The image section 15 is essentially a diode comprising a photocathode 20 connected to a −7.5 KV tap in the high voltage power supply 17' through a current limiting resistor 21. An anode 22 is connected to ground to complete the diode.

The photocathode 20 is deposited on the inner surface of a plano-concave fiber optic face plate in order that an optical image from the image intensifier 10 may be efficiently coupled thereto. Photoelectrons emitted by the photocathode 20 are focused onto the target 16 by an electrostatic lens formed by the concave photocathode and a conical end of the anode 22. Thus an optical image received by the photocathode 20 is transformed into an electron image which is focused on the target 16 (typically with some reduction in size).

The target 16 is of the secondary electron conduction (SEC) type described hereinbefore consisting of a supporting membrane of metal which forms the signal electrode and a porous layer of potassium chloride on the side of the supporting membrane opposite the photocathode 20. When the porous layer is scanned with the low velocity electron beam from the gun section 12, an electric field is established. Photoelectrons from the photocathode 20 accelerated by the high electric field between the photocathode 20 and anode 22 penetrate the aluminum membrane with sufficient energy to generate secondary electrons in the porous layer. These secondary electrons are then conducted out of the target 16 through the supporting membrane leaving a positive charge pattern in the porous layer, with spacial distribution and intensity corresponding to the optical image received by the photocathode 20.

The image intensifier 10 is a tetrode having a photocathode 24 on the concave surface of a plano-concave fiber optic face plate, an anode 25, a first focusing electrode 26 and a second focusing electrode 27. Light collected from a scene being viewed through an optical lens system (not shown) is imaged on the plane surface of the fiber optic face plate and transferred by the fibers to the photocathode 24 on the concave surface where photoelectrons are released in direct proportion to the light intensity at each point of the image.

The anode 25 is connected to the negative potential source of the photocathode 20, namely −7.5 KV, while the photocathode 24 is connected to a −23 KV tap of the high voltage power supply 17' through a current limiting resistor 28. The focusing electrodes 26 and 27 are connected to voltage taps in the power supply 17' at different potentials between the potential of the cathode 24 and the potential of the anode 25 to provide an electrical lens system. The voltage applied to the electrode 26 is normally fixed for the desired focus of photoelectrons onto a phosphor film 29 on the concave surface of a plano-concave fiber optic rear plate. The focusing electrode 27 is normally connected to a variable voltage in the power supply 17' so that the magnification of the image intensifier 10 may be varied in a manner analogous to a zoom lens.

The optic plate of the phosphor film 29 is adapted to have its plane surface interface directly with the plane surface of the fiber optic face plate of the SEC camera tube 11 such that an optical image created in the phosphor film 29 by electron bombardment from the photocathode 24 is transmitted directly onto the photocathode 20 through the fiber optics of the plano-concave plates on which the photocathode 20 and the phosphor film 29 are deposited. Consequently, while the image intensifier is being used with the SEC camera tube, the intensifier comprises the "optics" of the camera tube. Otherwise, the face plate of the camera tube comprises its "optics" for purposes of this invention. Similarly, the face plate comprises the "optics" of the image intensifier for purposes of this invention although it is understood that an optical lens system is generally provided in front of the image intensifier face plate.

SEC camera tubes and image intensifiers of the type illustrated schematically and described in general terms are commercially available. Accordingly, more detailed descriptions will not be provided, particularly since the details of construction and operation will vary between manufacturers. For the purpose of this invention it is sufficient to understand that the SEC camera tube does have a photocathode 20 which emits electrons that are accelerated by the high field between the anode 22 and the photocathode 20, and that the target 16 which receives the high energy electrons is of the type producing secondary electron conduction, as opposed to secondary electron emission, such that the target 16 is required to absorb all of the energy of the photoelectrons received.

In regard to the image intensifier 10, it is sufficient to understand that a photocathode 24 emits electrons which are accelerated by the high positive potential of the anode 25 with respect to the photocathode 24, and that the potentials of the electrodes 26 and 27 establish the focus of an electrostatic lens to produce a clear image on the phosphor 29 corresponding to the optical image received by the photocathode 24. Any change in potential of the photocathode 24 with respect to the electrodes 26 and 27 will defocus the photoelectron image on the phosphor 29, which is held at the same potential as the anode 25, typically through an internal connection, as shown.

To protect the image intensifier 10 and the SEC camera tube 11 against damage from excessively high levels of illumination, such as from the sun or a flash from a photo flash lamp, an explosion or a nuclear burst, a photodetector 30 is mounted to receive light from substantially the same scene being viewed by the SEC camera tube through its optics to develop a signal having an amplitude proportional to the level of illumination from the scene. A general threshold detector 31 responds to that signal to close a shutter 32 by energizing a relay $K_1$ through a first OR gate 33 when the signal amplitude exceeds a predetermined threshold which is set to provide protection against illumination levels comparable to that which might be received from the sun. The relay $K_1$ will remain energized as long as the illumination level remains sufficiently high to cause the output signal from the photodetector 30 to exceed the threshold of the general threshold detector 31.

In the event of a flash as may be produced by a photo flash lamp in close propinquity, i.e., in a proximity which may cause permanent damage to the target 16 of the SEC camera tube (about 6 feet), or some flash from an explosion or nuclear burst at a greater distance, the gradient of the output signal from the photodetector 30 will be sensed by a derivative network comprising a capacitor 34 and a resistor 35. If the gradient sensed exceeds a predetermined gradient level, a threshold detector 36 will trigger timing means comprising a first (hold one second) circuit 37 and a second (hold ten seconds) circuit 38. Each hold circuit may be implemented with conventional monostable multivibrator circuits. The circuit 37 will energize the relay $K_1$ through the OR gate 33 to close the shutter 32 for one second. It will also energize a relay $K_2$ through an OR gate 39 to connect the output of the photodetector 30 to a nuclear threshold detector 40. If the flash which results in triggering the circuit 37 is not of a nuclear burst, after the one second timing period of the first circuit 37, the amplitude of the signal from the photodetector 30 will not be sufficient to exceed the nuclear threshold level of the detector 40. Consequently, the relay $K_1$ is de-energized and the shutter 32 is opened. This prevents a non-nuclear explosion from holding the shutter closed for more than one second so that non-damaging scenes, such as a fire following the explosion, may be received by the SEC camera tube.

If the flash gradient which triggers the circuit 37 is of a nuclear burst, a second maximum of illumination from the nuclear burst will occur within the one second period and will exceed the nuclear threshold of detector 40 for a longer period, but not to exceed 10 seconds. Accordingly, the relay $K_2$ will be held in the energized condition through an AND gate 41 until the level of illumination drops below the nuclear threshold of detector 40. In the meantime, the output of the nuclear threshold detector 40 energizes the relay $K_1$ through the OR gate 33 to close the shutter 32. Thus circuit 38 assures that the nuclear threshold detector 40 will not energize the relay $K_2$ for a period longer than 10 seconds, the maximum duration of a damaging nuclear burst. However, the relay $K_1$ may continue to be energized at the end of that 10 second period if illumination from the scene being viewed by the photodetector 30 exceeds the level of the general threshold detector 31. For instance, an explosion in an oil field may trigger the holding circuits 37 and 38, and the ensuing fire will most assuredly produce an illumination level below that of a nuclear burst, but the illumination may be of sufficient intensity to cause permanent damage to the SEC camera tube 11 and perhaps even to the image intensifier 10. Therefore, the general threshold detector 31 is allowed to hold the shutter 32 closed directly through the OR gate 33.

The flash gradient threshold detector 36 and the nuclear threshold detector 40 are particularly important in military surveillance systems, such as a night vision system for target detection from an aircraft. However, bright point objects moving into the field of view, such as a tracer bullet, may have sufficient velocity to cause the gradient of a signal produced by the photodetector 30 to exceed the threshold of the detector 36, thereby closing the shutter 32 for one second. To avoid such bright point objects from triggering the circuit 37 when no damage would result to the image intensifier 10 or the SEC camera tube 11 (due to the short period that the object is in view), the aperture of the photodetector 30 is covered with a graded neutral density filter 42 having its grading from a maximum at the perimeter of the aperture to a minimum a short distance from the perimeter such that only approximately 90 percent of the aperture receives unfiltered light.

Figure 2:
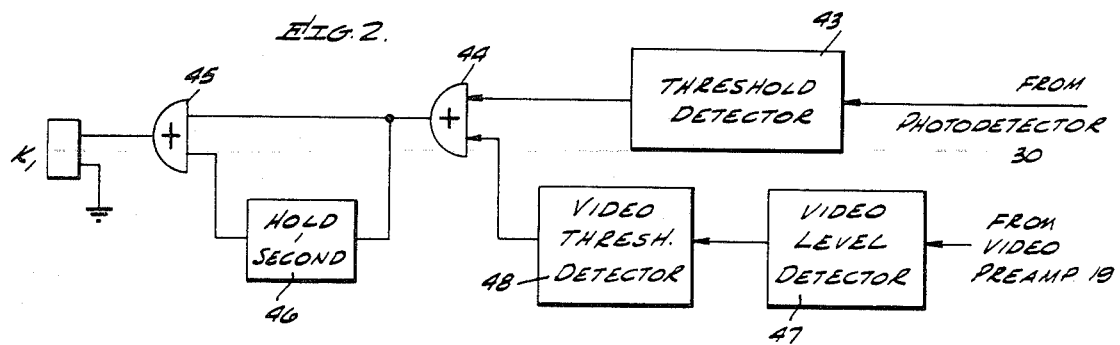
FIG. 2 illustrates an alternative shutter control system for the preferred embodiment.

An alternative system for closing the shutter 32 will now be described with reference to FIG. 2. A general threshold detector 43 is connected to the photodetector 30 to energize the shutter relay $K_1$ through OR gates 44 and 45. The output of the OR gate 44 triggers a hold-one-second circuit 46 to assure that once a damaging level of light is detected by the photodetector 30, the shutter will remain closed for one second, thereby allowing an iris (not shown) time to attenuate the illumination delivered to the image intensifier 10 to a safe level, or for some other appropriate action to be automatically taken, such as shutting down the high voltage power supply 17', depending upon the application of the invention. If the damaging level of illumination persists, the threshold detector 43 will continue to directly hold the shutter closed.

A video level detector 47 receives a video signal from the preamplifier 19 and provides a signal indicative of the average video level, which in turn is a measure of the current flowing through the target load resistor 18, in a manner similar to conventional rectifiers followed by a suitable filter. When that signal exceeds a predetermined amplitude corresponding to a dangerously high signal level that would cause permanent damage to the SEC camera tube, a predetermined threshold of a video threshold detector 48 will be exceeded and the shutter 32 will be closed via the OR gate 44.

Under either condition of overload, when the overload disappears, the shutter is held closed for one second through the action of the circuit 46. Accordingly, the timing (which may be by an RC circuit) is not allowed to start in the circuit 46 until the overload condition disappears.

While the shutter system is effective to protect the image intensifier 10 and SEC camera tube 11 from scenes of extreme brightness, including the second maximum of a nuclear burst which occurs at a time about 0.1 to 1.0 second (with a brightness about one-tenth of that of the first maximum but of longer duration), some damage may occur to the image intensifier and the SEC camera tube during the first maximum, particularly the SEC target 16 since it is a thin metal membrane which must absorb substantially all of the kinetic energy of photoelectrons emitted by the cathode 20. This is because of the inherent delay in closing the shutter 32.

As noted hereinbefore, the target damage condition is approximately 0.063 joules per square centimeter. That quantity is actually determined from the cathode potential and the photocathode sensitivity of about 150 microamperes per lumen. The maximum possible cathode current density is limited (by the parameters of voltage and electrode spacing) to a typical level of about 330 milliamperes per square centimeter. This limit implies a minimum time of about 27 microseconds for the target 16 to accumulate a damaging energy density. Thus the target 16 will not be damaged by an image of any size or brilliance if its duration is less than about 27 microseconds; but there is a delay of about 100 milliseconds in closing the shutter 32.

If the only energy available to the target 16 is that of the stored electrostatic energy of the photocathode 20, a critical size of image is implied below which the energy density is sufficient for damage, and above which the image density is not sufficient for damage. The actual dimensions of such a critical size of image will depend upon the parameters of the particular SEC camera tube being use, but for a capacitance of 10 picofarads to store the electrostatic energy, the critical size is found to be typically a spot of about 0.7 millimeters diameter. Thus, after about 27 microseconds, the target 16 may be damaged if the image on the photocathode 20 is smaller than the critical size. For a period of exposure up to about 100 milliseconds, permanent damage can occur for an illumination level about approximately $10^3$ foot-candles.

Since the SEC camera tube is self-protected for the first 26 microseconds due to its inherent limitation in photocathode current, and the shutter system will not be actuated, if at all, until after about 100 milliseconds, it is necessary to provide some means for protecting the target 16 after the initial 27 microseconds. That is accomplished by the current limiting resistors 21 and 28. The current limiting resistor 21 is effective to reduce the kinetic energy of photoelectrons emitted by the photocathode 20 after the electrostatic energy initially stored has been discharged since, to restore the energy from the power supply 15, electrons must be replaced in the photocathode 20 through the resistor 21, thereby providing a current therethrough which decreases (makes less negative) the potential of the photocathode 20. However, that in itself will not protect the target 16 for an indefinite period, after the initial 27 microseconds of immunity, if the high energy density persists on the same spot for a sufficiently long period of time. In other words, the current limiting resistor 21 provides a voltage drop which decreases the photocathode voltage to increase the maximum illumination level which can be received for a given period of time without damage, but since the maximum which can be tolerated decreases with time, damage may ultimately occur before the shutter 32 is closed. Thus, although the resistor 21 is effective to increase the time that an image of the given illumination level can be received by the photocathode 20 without damage to the target 16, the time may not be sufficiently long for the shutter 32 to be closed. Therefore, additional protection may be required.

The additional protection required for the target 16 is provided by the current limiting resistor 28 through which electrons emitted by the photocathode 24 are replaced. Accordingly, a current is established in the resistor 28 to provide a voltage drop of the photocathode 24 within 27 microseconds thereby decreasing the potential difference between the photocathode 24 and the focusing electrode 26. Once that potential difference is distrubed by as little as 5 to 10 volts, the image intensifier 10 is defocused, thereby causing the electron image on the phosphor 29 to spread out. The electron image from the photocathode 20 on the target 16 will be spread proportionately, thereby increasing the illuminated area of the target 16, and decreasing the energy density so that damage will not occur for an even longer period of time, if at all. In that manner, the current limiting resistor 28 will cause the image at the SEC target 16 to expand so that the available energy will be dissipated without damage to the target, while the resistor 21 is effective to reduce the available energy.

It should be noted that although protection is only sought for about 100 milliseconds, values for resistors 21 and 28 can be found to provide protection for all intensities and image sizes for exposure times even exceeding the inherent delay of the shutter, thus providing complete protection for all situations with just current limiting resistors. However, the values found may be too large for normal operation in some SEC camera tubes. That difficulty may be overcome by an alternative arrangement illustrated in FIG. 3.

Figure 3:
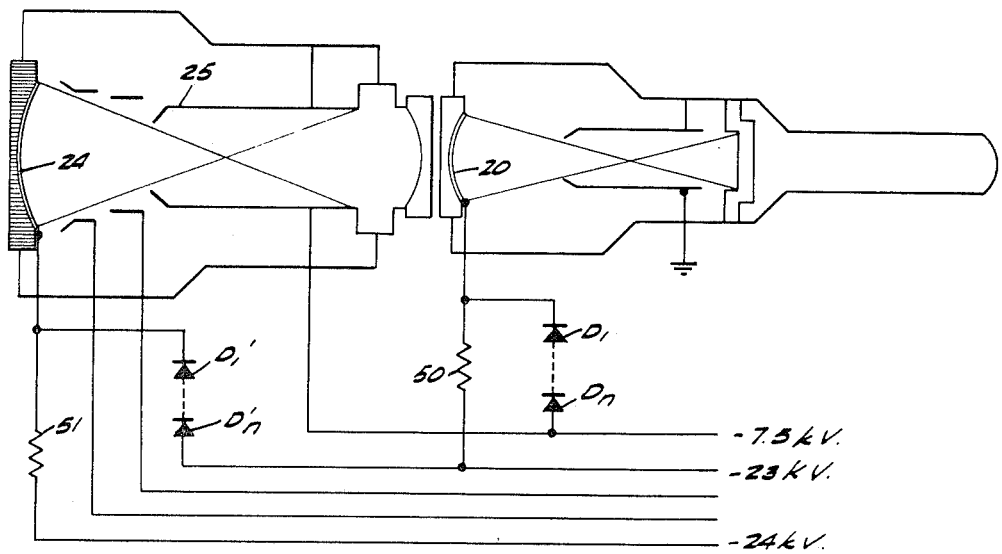
FIG. 3 illustrates schematically a modification of the preferred embodiment.

Referring now to FIG. 3, the alternative arrangement for protection of the target 16 involves the use of diodes to provide normal operating currents for the photocathodes 20 and 24 until their maximum operating currents are reached at which time the diodes are back biased and photocathode currents are provided through current limiting resistors. More specifically, with reference to the photocathode 20, diodes D1 to D$n$ (where $n$ is a number, such as 10, of diodes in series) are followed by a resistor 50 connected to the −23 kV supply. Under normal operation, the resistor 50, which may now be a rather large resistor, connected to the −23 kV supply will assure a constant current to the photocathode 20 due to the low internal resistance of forward biased diodes D1 to D$n$. When the operating current of the photocathode 20 increases sufficiently to reverse bias the diodes D1 to D$n$ (at approximately the maximum operating current of the photocathode), the large resistor 50 will significantly lower the potential of the photocathode 20 with just a small increase in photocurrent. Diodes D1' and D$n$' are similarly employed with a resistor 51 in series between the −23 kV and a −24 kV supply. Once the operating current to the photocathode 24 exceeds the maximum operating current, the diodes D1' to D$n$' are reverse biased and the potential of the photocathode 24 is allowed to vary as photocurrent increases beyond the maximum operating current to quickly defocus the image on the phosphor 29.

The advantage of this non-linear circuit over the linear circuit arrangement shown in FIG. 1 in connection with the photocathode 24 is that, for normal operation, variation in photocathode current will produce very little change in the potential of the photocathode 24 (due to the low internal resistance of the diodes D1' and D$n$' while forward biased). This is not as important for the photocathode 20 because the image section of the SEC camera tube 11 is a diode which will remain focused with appreciable changes in the photocathode potential in the order of 100 volts. Thus variations in the normal operating current to the photocathode 20 will not affect the focus. The image intensifier 10 on the other hand, is a tetrode which is more sensitive in its focus to variations of the photocathode potential such that a small change (in the order of 5 to 10 volts) is enough for the image on the phosphor 29 to be defocused.

It should be noted that under normal operating conditions the voltage developed across the resistor 21 will not be a threat to the fiber optics separating the photocathode 20 from the phosphor 29, but under severe overload conditions the voltage developed across the resistor 21 may approach 7 kV. Since that high voltage is directly across the fiber optics, unwanted ions may be outgassed into the image intensifier tube which will degrade the picture quality. An alternative arrangement for avoiding that problem consists of connecting the phosphor 29 to the photocathode 20 via the anode 25. That alternative is illustrated in ganged switches 52 and 53. As shown, switch 52 is closed for the first arrangement. In the alternative, the switch 53 is closed, thereby opening the switch 52.

With this alternative arrangement (switch 53 closed and switch 52 open), there is a sharper cutoff mechanism because when the photocurrent in the SEC camera tube starts to significantly cut off the SEC camera tube, the voltage drop across the resistor 21 increases, thereby changing the potential of the anode 25 in a positive direction. That will increase the gain of the image intensifier, and cause the photocurrent in the SEC camera tube to increase. However, the potential of the photocathode 20 is then much nearer the potential of the target 15 so that the electrons reaching the target 16 have less kinetic energy. That increases the allowable duration of the increased photocurrent condition.

What is claimed is:

1. In combination, an image intensifier having a photocathode, an anode, a focusing electrode between said photocathode and said anode, a power supply having a plurality of output voltage taps for providing voltages to said anode, focusing electrode and photocathode, said photocathode being coupled to a more negative voltage tap of said power supply than said focusing electrode to provide image focusing, and a first resistance device connected in the coupling between said photocathode and said more negative voltage tap, whereby excessive illumination produces current through said first resistance device at a level sufficient to cause the voltage level of said photocathode to change and thereby cause defocusing.

2. The combination of claim 1 including a low-light-level camera tube having a photocathode, and having a target susceptible to damage from excessive photoelectron bombardment, and further including a second resistance device coupled between said photocathode and a selected voltage tap of said power supply.

3. The combination of claim 2 wherein the target of said camera tube is a secondary electron conduction target.

4. The combination of claim 2 wherein each of said first and second resistance devices comprises a diode, a given diode having its cathode connected to one of said photocathodes, and a resistor having one end connected to the photocathode to which said cathode of said given diode is connected and the other end connected to a negative voltage tap of said power supply of greater voltage than the voltage of the power supply voltage tap connected to the anode of said given diode.

5. The combination of claim 1 wherein said first resistance device comprises a diode having its cathode coupled to said photocathode and a resistor coupled between said photocathode and a voltage tap of said power supply of greater voltage than the voltage of said power supply tap coupled to the anode of said diode.

6. The combination of claim 1 further comprising shutter means for blocking light from the input optics section of said image intensifier when the received illumination exceeds a first threshold level.

7. The combination of claim 1 further comprising:
a shutter device disposed in front of the optics of said image intensifier for blocking light from said optics in response to a control signal applied thereto;
photo detector means responsive to light from the scene being viewed for producing an intensity signal proportional to the intensity of the received light; and
derivative means responsive to said intensity signal for providing said control signal when the gradient of said intensity signal exceeds a first threshold level.

8. The combination of claim 1 wherein said derivative means includes timing means for providing said control signal for a first predetermined time period, nuclear threshold means for determining during said first predetermined time period if said intensity signal exceeds a second threshold level representative of illumination characteristic of a nuclear burst, and means responsive to said nuclear threshold detector means for continuing to provide said control signal while said second threshold level is exceeded during a second predetermined time period; whereby protection of said image intensifier is provided against the second as well as the first flash of a nuclear burst.

9. In an arrangement of a television camera and an image intensifier optically coupled together, with said image intensifier having a photocathode coupled to a source of a first potential of a power supply, a phosphorescent target, and focusing means at a second potential disposed between said photocathode and said phosphorescent target to provide an electrostatic lens for focusing onto said phosphorescent target an electron image emitted by said photocathode in response to received light, the focus being controlled at least in part by the potential of said intensifier photocathode relative to said given potential of said focusing means, wherein the improvement comprises: shutter means for blocking light from the input optics section of said image intensifier when the received illumination exceeds a threshold level; and a first resistive device coupled between said photocathode and said source of first potential; whereby an overload of photoelectron emission in response to received light causes a voltage drop across said first resistance device to change the potential of said photocathode thereby defocusing said electron image.

10. The improvement of claim 9 wherein the camera tube of said television camera has a photocathode, and a target susceptible to damage from excessive photoelectron bombardment; and said arrangement includes a second resistance device coupled between a selected output voltage tap of said power supply and said photocathode of said camera tube.

11. The improvement of claim 10 wherein said second resistance device comprises at least one diode having its anode connected to said selected output voltage tap and its cathode connected to said photocathode of said camera tube, and further including a resistor connected in series between said photocathode and a tap of said power supply of a greater negative voltage than said tap to which said anode is connected.

12. The improvement of claim 10 wherein each of said first and second resistance devices comprises a diode, a given diode having its cathode connected to one of said photocathodes, and a resistor connected between the photocathode to which said cathode of said given diode is connected and a more negative voltage tap of said power supply than the voltage of the power supply voltage tap connected to the anode of said given diode.

13. The improvement of claim 10 wherein the target of said camera tube is a secondary electron conduction target.

* * * * *